United States Patent [19]

Sutehall et al.

[11] Patent Number: 5,727,106
[45] Date of Patent: Mar. 10, 1998

[54] SUSPENDED LINE FOR AN OPTICAL FIBRE UNIT

[75] Inventors: Ralph Sutehall; Malcolm Owen Jones, both of Gwent, England

[73] Assignee: Pirelli General plc, Great Britain

[21] Appl. No.: 763,079

[22] Filed: Dec. 10, 1996

[30] Foreign Application Priority Data

Dec. 22, 1995 [GB] United Kingdom ............. 9526328

[51] Int. Cl.⁶ .................................................. G02B 6/44
[52] U.S. Cl. ........................... 385/100; 385/112; 385/113; 174/70 A
[58] Field of Search ........................... 385/100–114; 174/70 A

[56] References Cited

U.S. PATENT DOCUMENTS

| | | | |
|---|---|---|---|
| 5,092,663 | 3/1992 | Hivner | 385/100 |
| 5,448,670 | 9/1995 | Blew et al. | 385/112 |

FOREIGN PATENT DOCUMENTS

| | | |
|---|---|---|
| 0108590A1 | 5/1984 | European Pat. Off. . |
| 0155184 | 9/1985 | European Pat. Off. . |
| 0216584 | 4/1987 | European Pat. Off. . |
| 0345968A2 | 12/1989 | European Pat. Off. . |
| 0380872A | 6/1990 | European Pat. Off. . |
| 410735A2 | 1/1991 | European Pat. Off. . |
| 0521710A1 | 1/1993 | European Pat. Off. . |
| 0646818A1 | 4/1995 | European Pat. Off. . |
| 3037289A1 | 4/1982 | Germany . |
| 235601 | 9/1992 | New Zealand . |
| 252223 | 7/1995 | New Zealand . |
| 2104304 | 3/1983 | United Kingdom . |
| 2180666 | 4/1987 | United Kingdom . |
| 2245769 | 6/1990 | United Kingdom . |

*Primary Examiner*—Phan T. H. Palmer
*Attorney, Agent, or Firm*—Brooks Haidt Haffner & Delahunty

[57] ABSTRACT

An installation 10 comprising a line 12 extending between and suspended from a plurality of spaced apart aerial suspension locations 14 defines a passage for an optical fiber unit. The line comprises a plurality of elongate tensile resistant tubes 18 connected end-to-end by respective connectors 20. The line is secured to each suspension location by respective securing means 22 which are secured to said line at two spaced apart locations 28, 30 thereon such that the portion 26 of said line between these locations is untensioned and includes a connector 20. The securing means 22 is adapted to allow tensioning of the portion 26 of said line when the tensile load on the line adjacent thereto on either side of said suspension location reaches a first predetermined amount, and the connector 20 is adapted to cause the end-to-end connection of the tensile resistant tubes 18 connected thereby to break when the tensile load on said portion reaches a second predetermined amount. The first and second predetermined amounts are less than the tensile load for breaking the tensile resistant tubes and said second amount is no greater than said first amount.

15 Claims, 2 Drawing Sheets

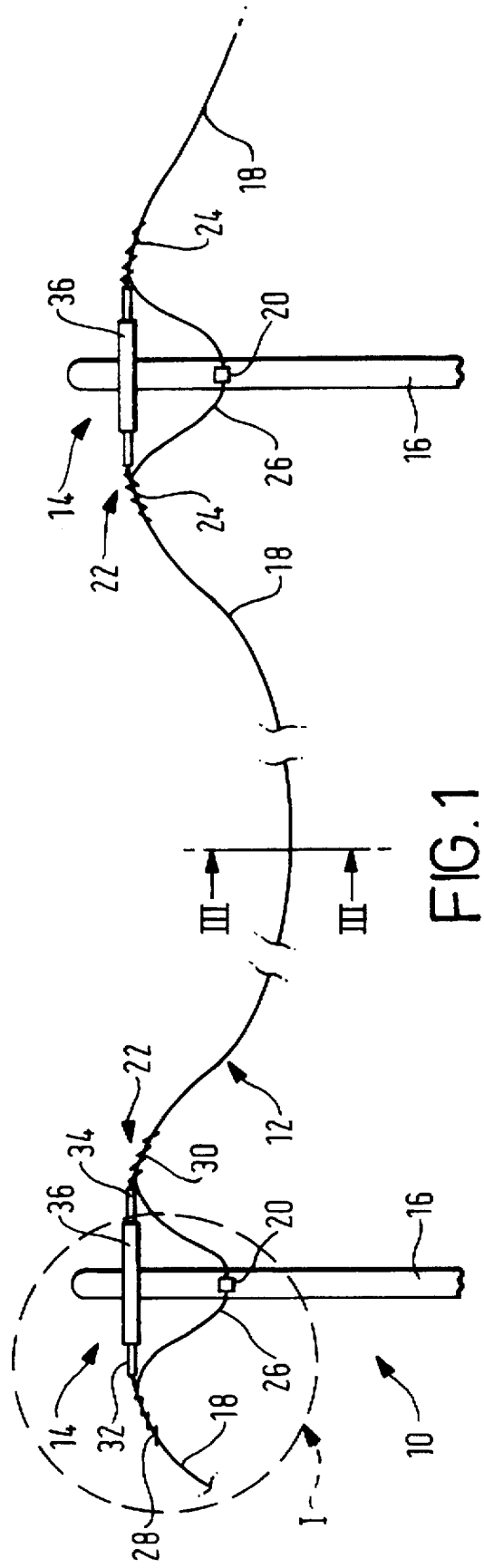
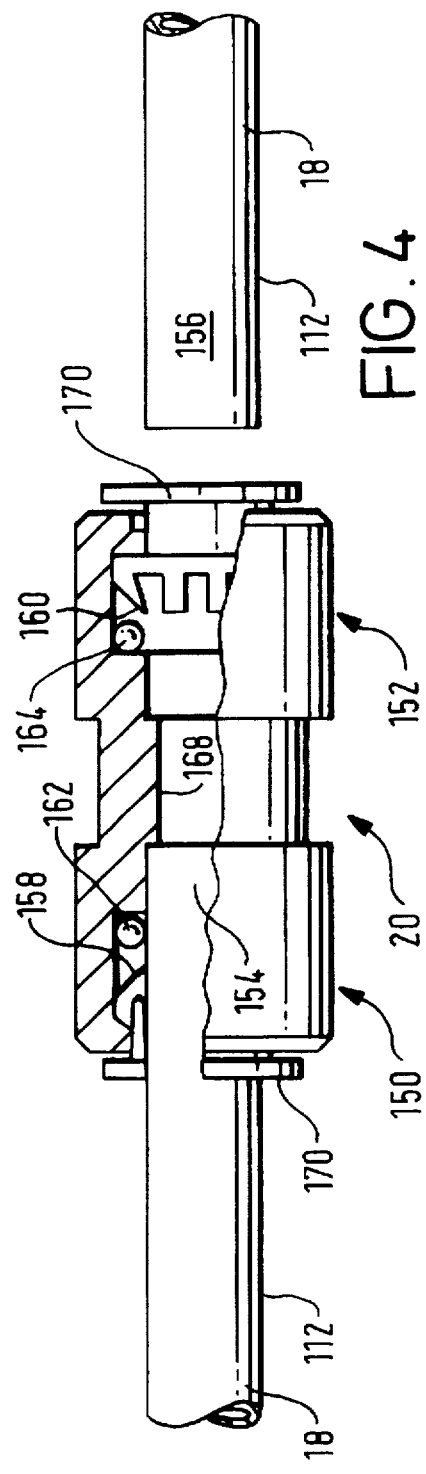
FIG. 1
FIG. 4

5,727,106

SUSPENDED LINE FOR AN OPTICAL FIBRE UNIT

FIELD OF THE INVENTION

This invention relates to a suspended line for an optical fibre unit, and more particularly to an installation comprising a line extending between and suspended from a plurality of spaced apart aerial suspension locations and defining a passage for an optical fibre unit.

BACKGROUND OF THE INVENTION

The optical fibre unit, which comprises at least one optical fibre and may take the form disclosed in EP-A-0345968, EP-A-0521710 or EP-A-0646818, may be introduced into the passage defined by the line after the line has been suspended from the spaced apart aerial locations by blowing as described in EP-A0108590. This avoids the fibre unit from being subjected to stresses occurring during the suspension of the line. The fibre unit is accommodated in the passage with excess length.

The line hangs in a catenary between adjacent aerial suspension locations, which for example may be provided by poles and which are typically 200 feet (61 meters) apart. The tensile strength of the line must be sufficient not only to resist axial stresses during its installation but also to support the weight of the line and any other weight loading such as that caused by ice, snow and wind. Furthermore, the strain in the line caused by such weight loadings must not result in the optical fibre unit in the passage being strained which will occur if the line extends by a distance greater than the excess length of the fibre unit.

In order to meet these requirements, it is desirable to provide the line with high tensile strength—i.e. a high Youngs Modulus in tension. However, whilst increasing the tensile strength of the line is advantageous in reducing the strain in the line due to the above-mentioned weight loadings, it has the disadvantage of increasing the tensile load required to break the line for example in the event of a high vehicle driving into it or a tree or structure falling on it and it is desirable that the line should break before any fittings on the line fail.

An object of the invention is to avoid this disadvantage.

SUMMARY OF THE INVENTION

According to the invention there is provided an installation comprising a line extending between and suspended from a plurality of spaced apart aerial suspension locations and defining a passage for an optical fibre unit, said line comprising a plurality of elongate tensile resistant members connected end-to-end by respective connector means, said line being secured to each suspension location by respective securing means secured to said line at two spaced apart locations thereon such that the portion of said line between said locations thereon is untensioned and includes a said connector means, said securing means being adapted to allow tensioning of said portion of said line when the tensile load on the line adjacent thereto on either side of said suspension location reaches a first predetermined amount and the connector means being adapted to cause the end-to-end connection of the tensile resistant members connected thereby to break when the tensile load on said portion reaches a second predetermined amount, said first and second predetermined amounts being less than the tensile load for breaking the tensile resistant members and said second amount being no greater than said first amount.

The invention also includes an installation as defined in the last preceding paragraph having a fibre unit extending through said passage.

The second predetermined amount may be less than 50% of the first predetermined amount and in an embodiment of the invention described hereinafter it is less than 15% of the first predetermined amount.

The securing means may take any suitable form, but in the above-mentioned embodiment the securing means comprises first and second means for frictionally gripping the exterior of the line at said two spaced apart locations on the line and respective means for securing said first and second gripping means to said aerial suspension location, said first and second gripping means being arranged to allow said line to slip relative thereto to tension said portion of the line between said two spaced apart locations thereon when the tensile load on the line adjacent to said portion on either side of said aerial suspension location reaches said first predetermined amount.

The above-mentioned securing means may comprise at least one elongate member helically wrapped about said line, and in the above-mentioned embodiment each of said first and second gripping means comprises the two end portions of a bent-double elongate member which end portions are helically wrapped about the line in the same sense. In this case, each of said respective means for securing said first and second gripping means to said aerial suspension location comprises means engaging the bend in the bent-double elongate member.

Each of elongate tensile resistant members in the embodiment comprises a tube for defining said passage having at least one tensile strength member coextensive therewith. The or each tensile strength member may be embedded in the wall of said tube and in the embodiment there are two said tensile strength members embedded in said wall, and the passage defined by the tube is located between said strength members.

The tube may comprise a plastics material and the or each tensile strength member may be a metallic member. The tube may have an outer surface which is substantially circular in cross-section.

Each connector means may comprise a tubular through connector, opposite end portions of which accommodate the ends of the tubes of the tensile resistant elongate members connected end-to-end thereby, said tube ends being gripped by respective gripping means of said end portions of said connector which retain said tube ends in said connector end portions against tensile withdrawal loads up to said second predetermined amount.

BRIEF DESCRIPTION OF THE DRAWING

In order that the invention may be well understood, the above-mentioned embodiment thereof, which is given by way of example only will be described in more detail with reference to the accompanying drawings, in which:

FIG. 1 is a schematic view of part of an installation comprising a line extending between and suspended from a plurality of poles and defining a passage for an optical fibre unit;

FIG. 4 is a partial cross-section of a connector of the line showing an end of one tube of the line inserted in one end portion and an end of another tube about to be inserted in the other end portion.

DESCRIPTION OF THE PREFERRED EMBODIMENT(S)

Figure 2:
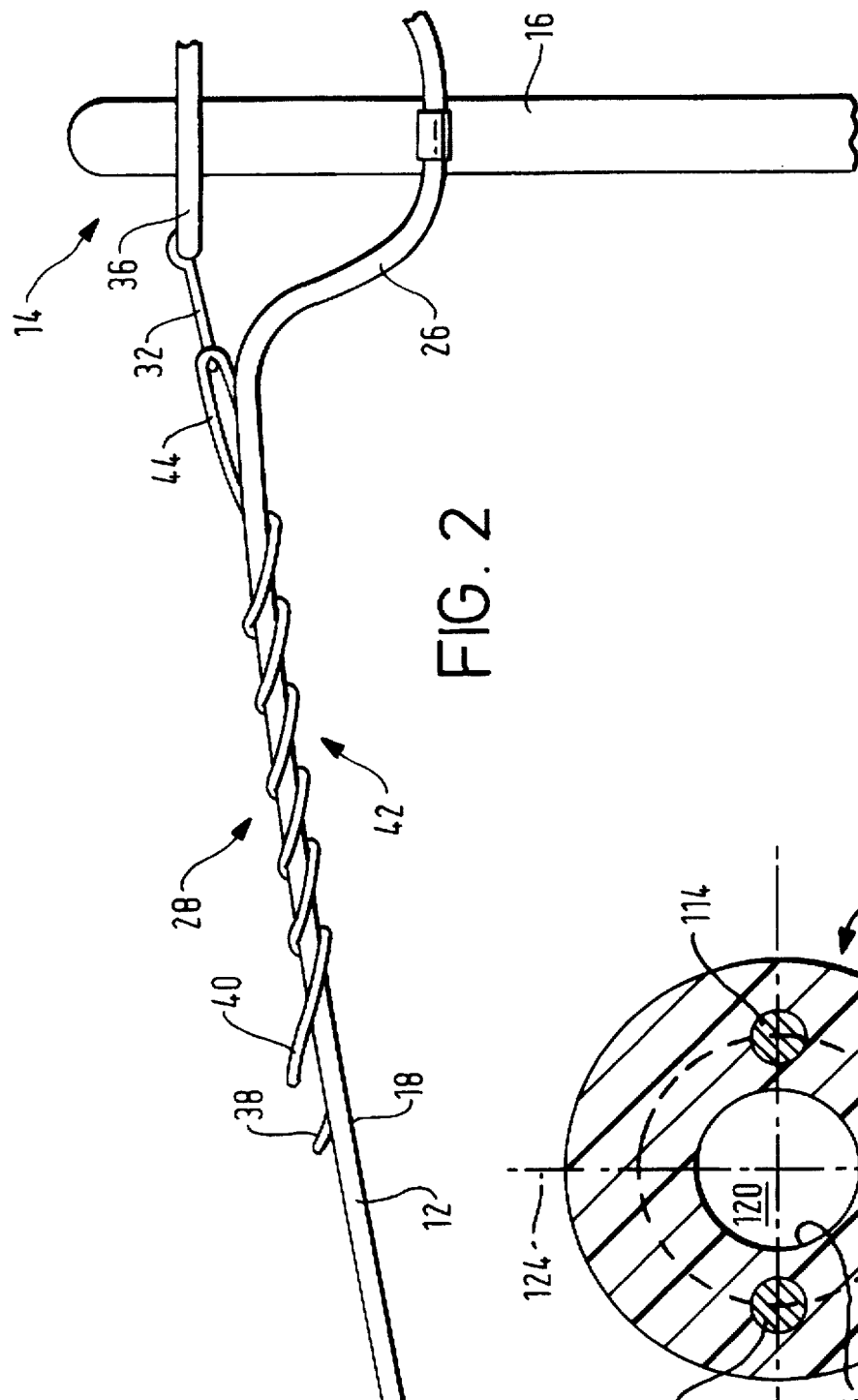
FIG. 2 is detail II of FIG. 1 to a larger scale than FIG. 1.

Referring to FIG. 1, there is shown part of an installation 10 comprising a line 12 extending between and suspended from aerial suspension locations 14 provided on a plurality of spaced apart poles 16. The line 12 defines a passage for an optical fibre unit which is subsequently blown into the passage after suspension of the line.

The line comprises a plurality of elongate tensile resistant members 18 connected end-to-end by respective connector means 20, each of which comprises a tubular through connector in the embodiment. The line is secured to each suspension location 14 by respective securing means 22. Each securing means is secured to the line at two spaced apart locations 24 thereon such that the portion 26 of the line between the locations 24 is untensioned and includes a connector 20.

The securing means 22 is adapted to allow tensioning of the portion 26 between the location 24 when the tensile load on the line adjacent to the portion 26 on either side of the suspension location 14 reaches a predetermined amount and the connector 20 is adapted to cause the end-to-end connection of the tensile resistant members 18 connected thereby to break when the tensile load on the portion 26 reaches a second predetermined amount. The above-mentioned first and second predetermined amounts are less than the tensile load for breaking the tensile resistant members 18 and the second predetermined amount is no greater than the first.

Accordingly, when the line adjacent to an untensioned portion 26 is subjected to a tensile load above the first predetermined amount but insufficient to break the cable, the portion 26 will become tensioned and the end-to-end connection will break. This will allow the line to fall.

The securing means 22 at each pole comprises first and second means 28, 30 for frictionally gripping the exterior of the line at the two spaced apart locations 24 and respective means 32, 34 for securing the gripping means to a ring 36 on the pole providing the aerial suspension location. The gripping means are arranged to allow the line to slip relative thereto to tension the portion 26 of the line between the locations 24 when the tensile load on the line adjacent to that portion on either side of the ring 26 reaches the above-mentioned first predetermined amount.

Each of the first and second gripping means 28, 30 comprises at least one elongate member helically wrapped about the line 12. The arrangement on each side of the pole is identical and the left hand side is illustrated in more detail in FIG. 2. In FIG. 2 the first gripping means 28 is illustrated and comprises the two end portions 38, 40 of a bent double elongate member 42—these end portions being helically wrapped about the line 12 in the same sense, and the means for securing the elongate member 42 to the pole ring 36 comprises a tensile connection which engages the bend, or loop, 44 in the bent double elongate member 42 and the pole ring 36. This connection may include means for adjusting the tension in the line 18 adjacent the untensioned portion 26 thereof.

Figure 3:
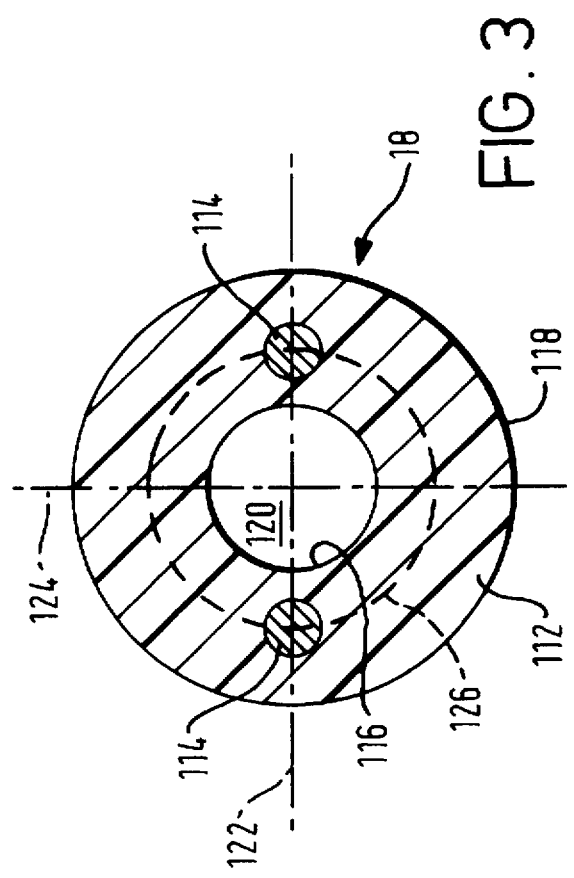
FIG. 3 is a section along the line III—III in FIG. 1.

As illustrated in FIG. 3, each of the elongate tensile resistant members 18 comprises a tube 112. The tube, which is formed of plastics material, has two metallic tensile resistant, or strength, members 114 embedded in its annular wall. The members 114 are coextensive with the tube. As shown, the inner and outer surfaces 116, 118 of the wall of the tube are substantially circular in cross-section and the wall has a substantially uniform radial thickness. The inner surface is smooth so as not to hamper the passage therethrough of a fibre unit being blown into the tube and the outer surface is free of any recesses which might retain water. Also, the substantially circular cross-section of the outer surface 118 renders easier clamping of the tube by the securing means 22 discussed above. The passage 120 defined by the tube is located between the members 114 which are diametrically opposite each other. The location of the members has the advantage that the tube has two planes at right angles in which it has maximum and minimum bending flexibility. Maximum flexibility occurs where the neutral axis extends through the members 114 as indicated by 122 and minimum flexibility occurs when the neutral axis extends between the members 114 as indicated at 124. This feature is advantageous in that it assists locating the tube in a desired orientation.

The tube may comprise a single layer or a plurality of layers. In FIG. 3, the dotted line 126 indicates the boundary between the inner and outer layers of a two layer tube. These layers may be made of different materials each chosen for its mechanical and/or electrical properties. For example, advantageously, the inner layer is loaded with carbon for dissipating static electricity. The or each layer may be formed by extrusion and the layers of the two layer tube may be co-extruded with the members 114 being introduced between the layers during this process.

Referring now to FIG. 4, the tubular through connector which forms the connector means 20 has opposite end portions 150, 152 which accommodate the ends 154, 156 of the tubes 112 of the tensile resistant elongate members 18 connected end-to-end thereby. Each tube end is gripped by respective gripping means 158, 160 in the end portions 150, 152 and these gripping means retain the tube end in the connector end portions against tensile withdrawal loads up to the above-mentioned second predetermined amount.

The connector 20 is also provided with O-ring seals 162, 164 in its end portions for sealing against the exterior of the tube ends. The connection is easily made simply by pushing the tube ends into the end portions until they engage an internal shoulder 168. In FIG. 4, the tube end 154 is shown fitted and gripped in the connector end portion 150 and the tube end 156 is shown prior to push-fitting. Each gripping means 158, 160 comprises a metal ring having a plurality of circumferentially spaced apart radially and axially inwardly extending projections or barbs. These barbs are able to deflect radially outwardly on insertion of the tube end into the end portion of the connector but dig into the exterior of the tube end to resist subsequent withdrawal of the tube end from the connector. A collet 170 engageable with the barbs on axial inward movement relative to the connector end portion to deflect the barbs radially outwardly is provided to enable the tube end to be withdrawn from the connector end portion should it become desirable to remake the connection or gain access to the passage defined by the line at the location of the connection. The connection formed by the connector and the tube ends is gas tight so that there will be no leakage of gas during blowing in of the optical fibre unit. The connection made is able to withstand relatively low tensile loads but would break when subject to a tensile load corresponding to the above-mentioned second predetermined amount. Breakage of the connection occurs due to the gripping fingers 168 failing to prevent withdrawal of the tube.

In the above-described installation the outside diameter of the tube is 6.0 mm; the Youngs Modulus intention is 200 $GN/m^2$. The tensile load required to break the tube is about 1500N; and the maximum working tensile load which will still allow an excess length of fibre unit is 1200N. The securing means 22 are arranged to allow the line to slip relative thereto when the line is subjected to a tensile load of about 1350N (the above-mentioned first predetermined amount); and the tube pulls from the connector when the portion 26 of the line is subjected to a tensile load of about 170N (the second predetermined amount referred to hereinbefore).

It is to be understood that other securing means and other connectors may be used.

It will be appreciated that in the embodiment, the end-to-end connection made by the connector 20 breaks at a tensile load which is considerably less than the tensile load which causes slipping of the tube through the securing means 22. Thus, the line quickly breaks at the connector. However, the desired result will still be achieved providing the tensile load required to break the connection is no greater than the tensile load which causes the tube to slip relative to the securing means 22.

We claim:

1. An installation comprising a line extending between and suspended from a plurality of spaced apart aerial suspension locations and defining a passage for an optical fibre unit, said line comprising a plurality of elongate tensile resistant members connected end-to-end by respective connector means, said line being secured to each suspension location by respective securing means secured to said line at two spaced apart locations thereon such that the portion of said line between said locations thereon is untensioned and includes a said connector means, said securing means being adapted to allow tensioning of said portion of said line when the tensile load on the line adjacent thereto on either side of said suspension location reaches a first predetermined amount and the connector means being adapted to cause the end-to-end connection of the tensile resistant members connected thereby to break when the tensile load on said portion reaches a second predetermined amount, said first and second predetermined amounts being less than the tensile load for breaking the tensile resistant members and said second amount being no greater than said first amount.

2. An installation as claimed in claim 1, wherein each of said elongate tensile resistant members comprises a tube for defining said passage having at least one tensile strength member coextensive therewith.

3. An installation as claimed in claim 2, wherein at least one tensile strength member is embedded in the wall of said tube.

4. An installation as claimed in claim 3, wherein there are two said tensile strength members embedded in said wall, and the passage defined by the tube is located between said strength members.

5. An installation as claimed in claim 2, wherein said tube comprises a plastics material.

6. An installation as claimed in claim 2, wherein at least one tensile strength member is a metallic member.

7. An installation as claimed in claim 2, wherein said tube has an outer surface which is substantially circular in cross-section.

8. An installation as claimed in claim 2, wherein each said connector means comprises a tubular through connector, opposite end portions of which accommodate the ends of the tubes of the tensile resistant elongate members connected end-to-end thereby, said tube ends being gripped by respective gripping means of said end portions of said connector which retain said tube ends in said connector end portions against tensile withdrawal loads up to said second predetermined amount.

9. An installation as claimed in claim 1, wherein at each aerial suspension location, each securing means comprises first and second means for frictionally gripping the exterior of the line at said two spaced apart locations on the line and respective means for securing said first and second gripping means to said aerial suspension location, said first and second gripping means being arranged to allow said line to slip relative thereto to tension said portion of the line between said two spaced apart locations thereon when the tensile load on the line adjacent to said portion on either side of said aerial suspension location reaches said first predetermined amount.

10. An installation as claimed in claim 8, wherein each said first and second gripping means comprises at least one elongate member helically wrapped about said line.

11. An installation as claimed in claim 9, wherein each of said first and second gripping means comprises the two end portions of a bent-double elongate member, which end portions are helically wrapped about said line in the same sense.

12. An installation as claimed in claim 11, wherein each of said respective means for securing said first and second gripping means to said aerial suspension location comprises means engaging the bend in the bent-double elongate member.

13. An installation as claimed in claim 1, wherein said second predetermined amount is less than 50% of said first predetermined amount.

14. An installation as claimed in claim 13, wherein said second predetermined amount is less than 15% of said first predetermined amount.

15. An installation as claimed in claim 1 having a fibre unit extending through said passage.

* * * * *